United States Patent
Choi et al.

(10) Patent No.: US 9,588,010 B2
(45) Date of Patent: *Mar. 7, 2017

(54) APPARATUS FOR SOIL BOX EXPERIMENT APPLYING VIBRATION

(71) Applicant: KOREA INSTITUTE OF GEOSCIENCE AND MINERAL RESOURCES (KIGAM), Daejeon (KR)

(72) Inventors: Jung-Hae Choi, Daejeon (KR); Byung-Gon Chae, Daejeon (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 285 days.

This patent is subject to a terminal disclaimer.

(21) Appl. No.: 14/262,901

(22) Filed: Apr. 28, 2014

(65) Prior Publication Data
US 2014/0318258 A1    Oct. 30, 2014

(30) Foreign Application Priority Data

Apr. 29, 2013    (KR) .................. 10-2013-0047330

(51) Int. Cl.
*B06B 3/00*    (2006.01)
*G01N 29/00*    (2006.01)
*G01M 7/02*    (2006.01)

(52) U.S. Cl.
CPC .................. *G01M 7/027* (2013.01)

(58) Field of Classification Search
CPC ........... G01M 7/02; G01M 7/027; G01M 7/04
USPC ..................................... 73/662, 663
See application file for complete search history.

(56) References Cited

U.S. PATENT DOCUMENTS

| | | | | |
|---|---|---|---|---|
| 1,314,943 A | * | 9/1919 | Biedma ................. | G09B 23/40 312/209 |
| 2,933,165 A | * | 4/1960 | Rose ...................... | E04H 12/32 248/534 |
| 4,537,077 A | * | 8/1985 | Clark et al. ........... | G01M 7/022 367/190 |
| 6,263,293 B1 | * | 7/2001 | Scott ...................... | G01M 7/06 702/113 |

OTHER PUBLICATIONS

Author: unknown, Title: Chapter 24—Permanent Displacement and Deformation of Liquefied Subsoil, date: 2008, Publisher: Springer Berlin Heidelberg, Book: Geotechnical Earthquake Engineering, pp. 493-536.*

* cited by examiner

*Primary Examiner* — Lisa Caputo
*Assistant Examiner* — Roger Hernandez-Prewit
(74) *Attorney, Agent, or Firm* — Ladas & Parry LLP

(57) ABSTRACT

Provided is an apparatus for a soil box experiment applying vertical vibration. The apparatus for the soil box experiment applying the vertical vibration includes: a soil box for realizing a slope on which landslide occurs, the soil box being inclinedly disposed and having an opened upper portion to accommodate soil therein, a base member disposed under the soil box to support the soil box, and a vibration unit disposed on the base member to vertically vibrate the soil box.

9 Claims, 6 Drawing Sheets

APPARATUS FOR SOIL BOX EXPERIMENT APPLYING VIBRATION

CROSS-REFERENCE TO RELATED APPLICATIONS

This U.S. non-provisional patent application claims priority under 35 U.S.C. §119 of Korean Patent Application No. 10-2013-0047330, filed on Apr. 29, 2013, the entire contents of which are hereby incorporated by reference.

BACKGROUND OF THE INVENTION

The present invention relates to a technique for studying and preventing geologic hazards such as landslides and slope failure, and more particularly, to an apparatus for a soil box experiment through which the behavior of a slope due to a shape and vibration of the slope is capable of being experimentally studied.

The landslides may occur when soil mass is slid along a top of a bedrock. A landslide surface may gradually form a slip failure surface to start an occurrence of sliding, thereby causing a debris flow. Thus, the behavior of the landslide surface may be classified into states before, during, and after the slope failure.

Very slow landslide that corresponds to the state before the slip may be progressed at a speed of about $10^{-6}$ cm/s or less. Here, although the soil mass on the slope is activated, it may be difficult to confirm the activation of the soil mass by using naked eyes. After the slope is failed, the soil mass may move as a speed of about 0.1 cm/s. If the behavior of the relatively quick landslide is called "very quickly moving landslide", the progressing speed may reach about 5 cm/s. Also, the above-described landslide, if proper soil strength is reduced, like liquefaction of sandy soil, a debris flow may occur, and thus, the soil mass may move, like a fluid. Here, the soil mass may have a maximum speed of about 10 m/s.

The landslide may occur by various external factors such as earthquake (vibration), local torrential rainfalls, thaw, and the like, particularly, may mainly occur by the vibration and the local torrential rainfalls.

A soil box may be used as an experiment apparatus for studying the behavior of the landslide slope. The soil box has a box shape that is long in one direction and inclinedly disposed. Also, water may be supplied through an upper portion of the soil box. That is, a slope may be formed as the soil box is inclined, and a water supply may be used to simulate rain. The soil box may change in inclination, and also, a supply amount of water may be adjusted.

As described above, since the existing soil box is adjusted in inclination and water supply amount, the slope behavior due to the inclination and rainfall may be apprehended. However, it may be difficult to apprehend the slope behavior due to vibration of the slope.

Although existing soil boxes play important roles in modeling important factors of the landslides such as localized heavy rain and inclination, other factors such as earthquakes and even man-made vibrations such as those brought about by blasting in construction and civil engineering sites may also need to be considered.

Thus, the development of the soil box experiment apparatus in consideration of the vibration in the slope behavior is required.

Also, since the conventional soil box has the box shape, the soil box may have a flat bottom surface. Thus, it may be difficult to accurately reproduce an actual slope. This is done because the actual slope has various shapes in which convex and concave portions are repeatedly formed. Also, since the shape of the slope has a large influence on the debris flow, it is needed to develop the experiment apparatus through which the actual slope of the landslide surface is capable of being substantially reproduced.

SUMMARY OF THE INVENTION

The present invention provides an apparatus for a soil box experiment, which applies vertical vibration, having an improved structure to apply a vibration motion such as earthquake and blasting, which is one of landslide occurrence causes, and a shape of a variable landslide surface, having an improved structure to adjust the shape of the landslide surface.

Embodiments of the present invention provide an apparatus for a soil box experiment applying vertical vibration, the apparatus comprising: a soil box being inclinedly disposed and having an opened upper portion to accommodate soil therein; a base member disposed under the soil box to support a soil box; and a vibration unit disposed on the base member for vibrating the soil box up and downwards.

In some embodiments, the vibration unit may include a cylinder as the vibration unit comprises; a cylinder body disposed within the base member; and a piston movable up and downward in the cylinder body, wherein an upper end of the piston is coupled to the soil box. Also, two cylinders may be provided which are spaced apart from each other in a longitudinal direction of the soil box, and their corresponding pistons may be hingeably coupled to the soil box.

In other embodiments, the soil box provides a clinometer attached to the soil box to apprehend an inclined degree of the soil box.

In still other embodiments, the shape changing units change the shape of the bottom surface of the soil box which may comprise a surface plate disposed on the bottom surface of the soil box, in which the surface plate is formed of a bendable and flexible material; and a plurality of height-adjusting members disposed on the bottom surface of the soil box to move up and downwards, in which the plurality of height-adjusting members are for adjusting a height of the surface plate.

Also, each of the height-adjusting members comprises a height-adjusting bar having a bar shape and lengthily disposed on the bottom surface of the soil box.

In even other embodiments, a plurality of height-adjusting bolts may be spaced apart from each other along a longitudinal direction of the height-adjusting bar and screw-coupled, and the height-adjusting bolts are movable up and downwards with respect to the height-adjusting bar.

Especially some of the height-adjusting bars may be rotatable on the bottom side of the soil box.

The height-adjusting member comprises a plurality of height-adjusting bolts that are screw-coupled to the bottom surface and movable up and downwards.

In further embodiments, a plurality of through holes in which the height-adjusting bolts are respectively fitted are defined in the bottom surface of the soil box, and the apparatus further comprises a nut that is rotatable with respect to the bottom surface of the soil box and vertically fixed in position to vertically move the height-adjusting bolts as the nut is forwardly or backwardly rotated.

In still further embodiments, the height-adjusting members comprises a first height-adjusting bolts having a bolt shape and screw-coupled to bottom of the soil box, a plurality of height-adjusting bars lengthily disposed in one direction and movable up and downwards between a first position at which each of the height-adjusting bar is inserted into the bottom surface of the soil box and a second position at which the each of the height-adjusting bar protrudes from the bottom surface, and a second height-adjusting bolts having a bolt shape and screw-coupled to the height-adjusting bar, the plurality of are disposed in traverse and longitudinal directions of the soil box, and the first and second height-adjusting bolts are disposed in a matrix form on the bottom surface.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, an apparatus for a soil box experiment according to a first embodiment of the present invention will be described with reference to the accompanying drawings.

Figure 1:
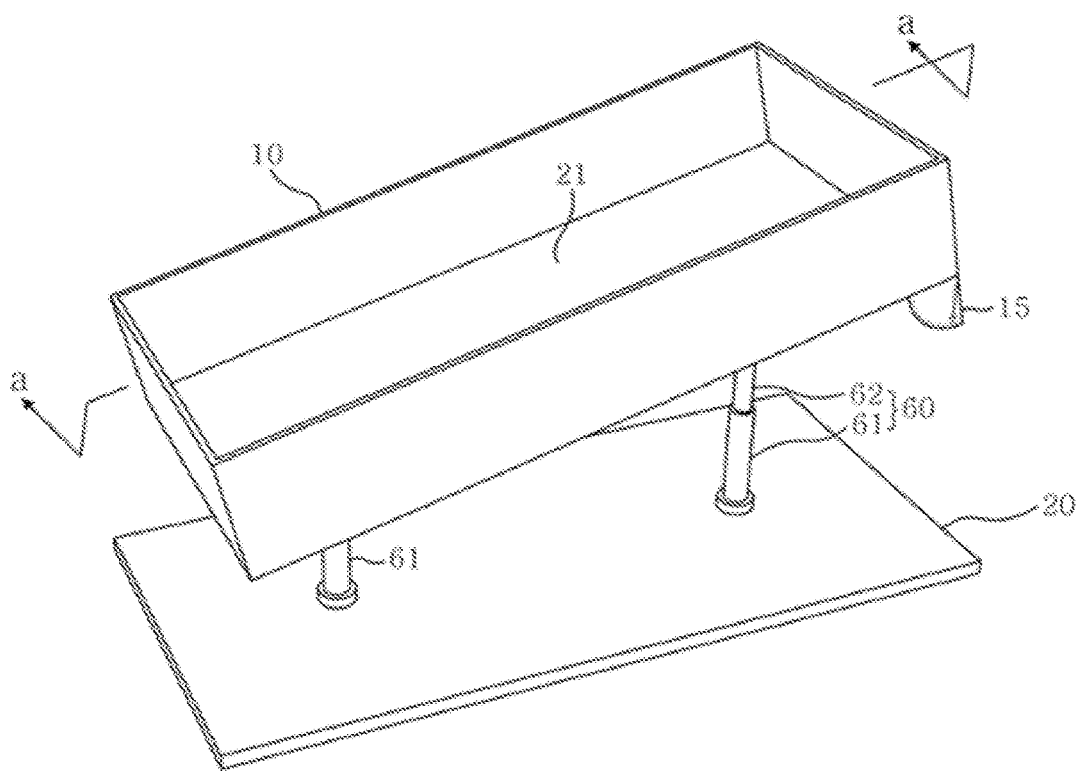
FIG. 1 is a perspective view of an apparatus for a soil box experiment applying vertical vibration according to a first embodiment of the present invention.
Figure 2:
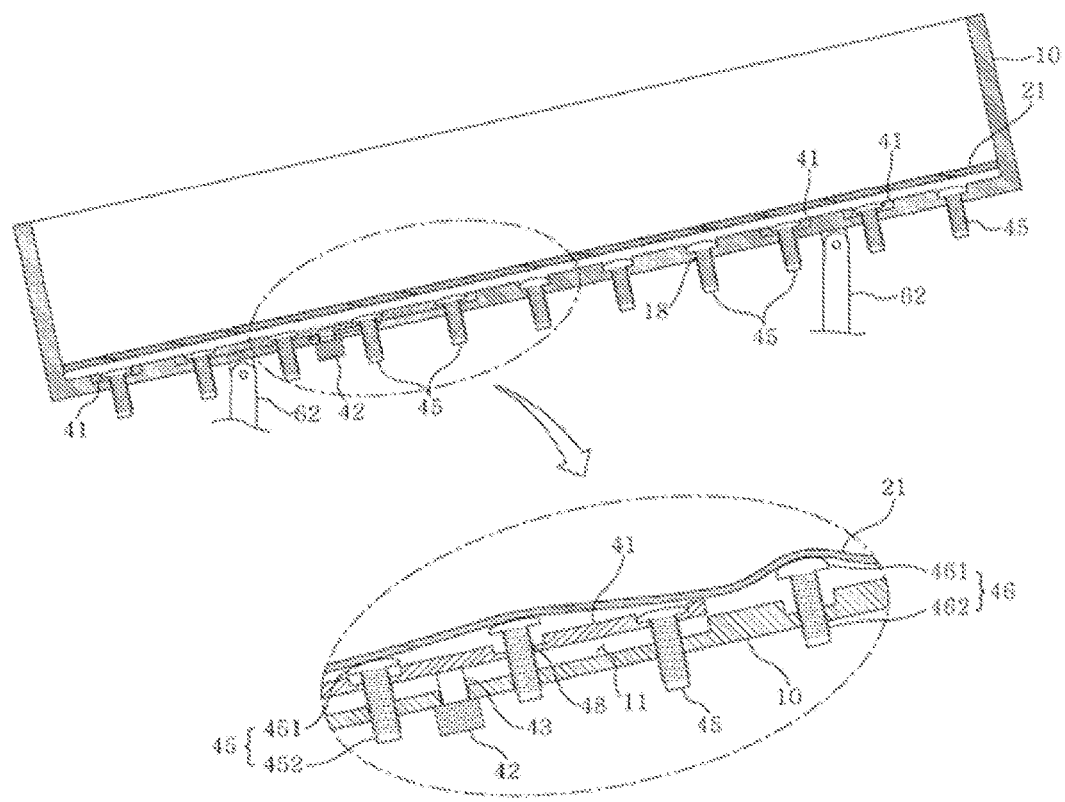
FIG. 2 is a schematic cross-sectional view taken along line A-A of FIG. 1.
Figure 3:
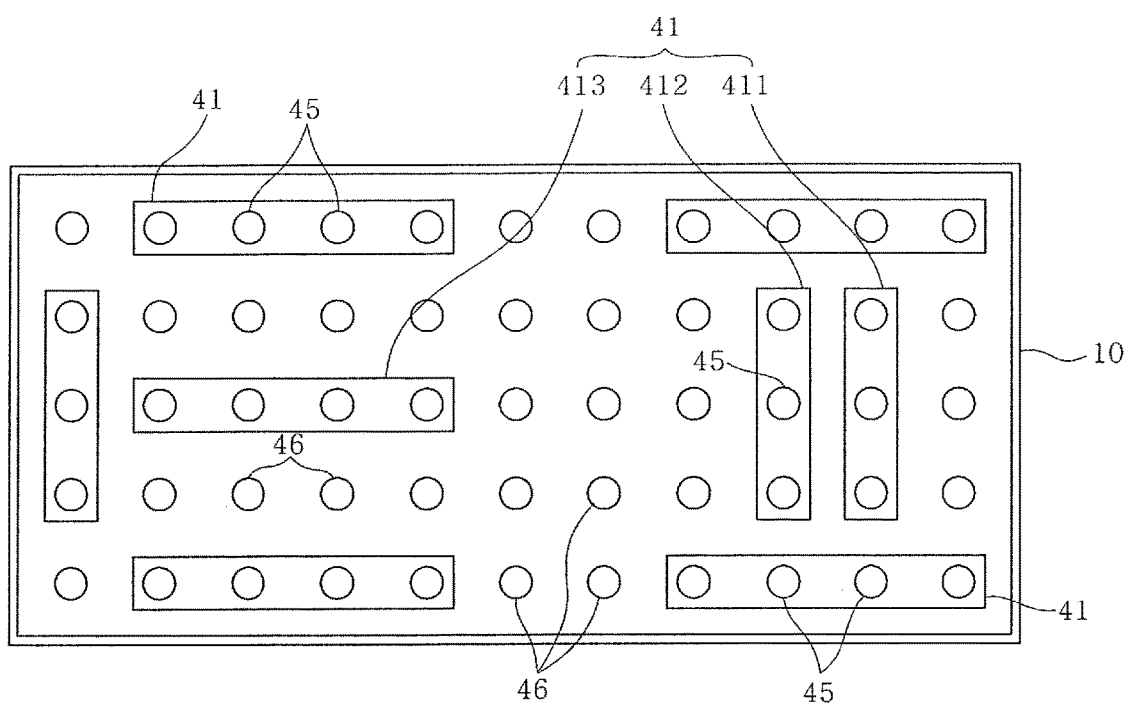
FIG. 3 is a schematic plan view of a bottom surface of the soil box in a state where a surface plate of the soil box is removed.
Figure 4:
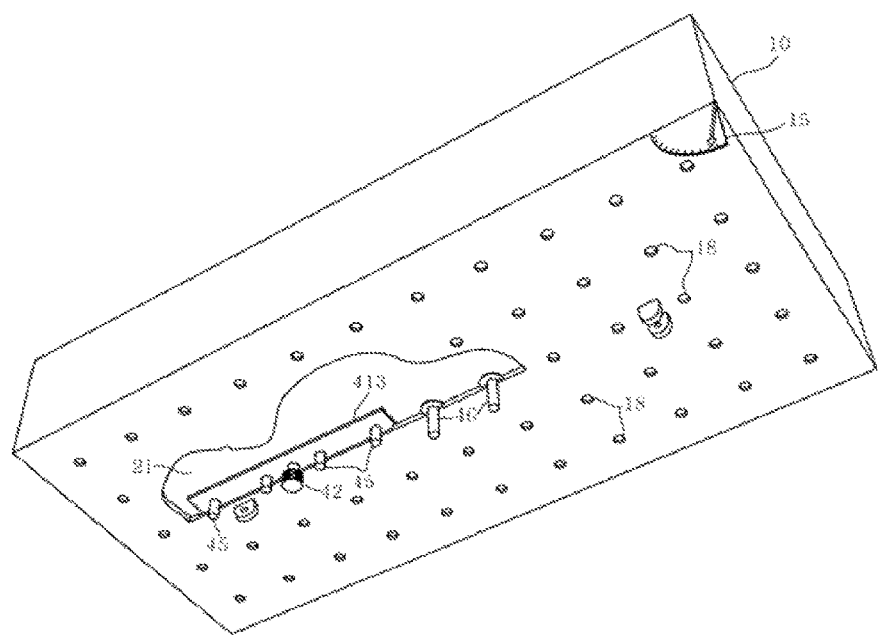
FIG. 4 is a partial cutoff perspective view of the soil box when viewed from a lower side.
Figure 5:
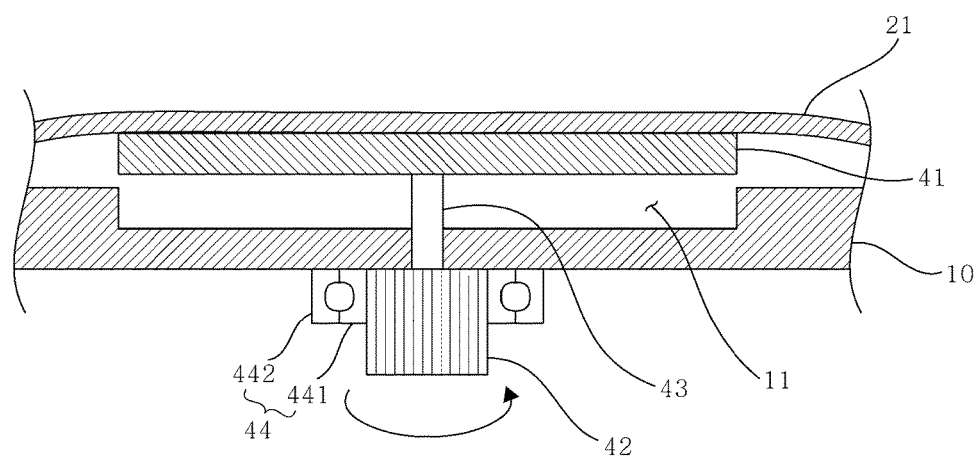
FIG. 5 is a partial enlarged cross-sectional view for explaining the composition of rotating height-adjusting bar (the height-adjusting bar is described simply)

FIG. 1 is a perspective view of an apparatus for a soil box experiment applying vertical vibration according to a first embodiment of the present invention, FIG. 2 is a schematic cross-sectional view taken along line A-A of FIG. 1, FIG. 3 is a schematic plan view of a bottom surface of the soil box in a state where a surface plate of the soil box is removed, FIG. 4 is a partial cutoff perspective view of the soil box when viewed from a lower side, and FIG. 5 is a partial enlarged cross-sectional view of FIG. 4.

Referring to FIGS. 1 to 5, the apparatus for the soil box experiment applying vertical vibration (hereinafter called as soil box experiment) according to the first embodiment of the present invention includes a soil box 10, a base member 20, a shape changing unit, and a vibration unit.

The soil box 10 may reproduce a slope, on which a landslide occurs, as a model. In the current embodiment, the soil box 10 has a hexahedral shape that extends in one direction and has an opened upper portion. The soil box 10 may be inclinedly disposed to accommodate soil therein. A clinometer 15 for displaying an inclined degree of the soil box 10 is attached to one side of the soil box 10.

The present invention has an important technical feature in that the bottom surface of the soil box variously varies to give the same condition as a slope on which an actual landslide occurs. Thus, the present invention may include the shape changing unit.

The shape changing unit includes a surface plate 21 and a height-adjusting member.

The surface plate 21 may be formed of a flexible material that is capable of being bent. The surface plate 21 is disposed on the bottom surface of the soil box 10. The surface plate 21 has a rectangular shape corresponding to that of the bottom surface of the soil box 10. Also, four sides of the surface plate 21 may be closely attached to four sidewalls of the soil box 10 to prevent the soil from leaking between the surface plate 21 and the sidewalls of the soil box 10.

In the current embodiment, the surface plate 21 may be formed of a rubber material. Concavo-convex portions (not shown) having various shapes may be formed on a top surface of the surface plate to adjust roughness on the top surface of the surface plate 21, thereby preventing the soil placed thereon from being slid. Although the surface plate 21 is formed of cloth or felt having elasticity in another embodiment, the present invention is not limited thereto. For example, the surface plate 21 may be formed of various flexible materials.

The height-adjusting member may move up and downwards each area of the surface plate 21 to form a curve on the surface plate 21. The height-adjusting member may be installed on the bottom side of the soil box 10 and movable up and downwards.

In the current embodiment, the height-adjusting member includes a height-adjusting bar 41, a first height-adjusting bolt 46, and a second height-adjusting bolt 45.

The height-adjusting bar 41 may have a long bar or rod shape and be installed on the bottom surface of the soil box 10. The height-adjusting bar 41 may lift the surface plate 21 on an area that is relatively greater than that of each of the height-adjusting bolts that will be described later. The height-adjusting bar 41 may be provided in plurality. The plurality of height-adjusting bars 41 may be transversely and longitudinally disposed on the bottom surface of the soil box 10.

As illustrated in the drawings (e.g., as shown in FIGS. 4 and 5), a groove 11 is defined in the bottom surface of the soil box 10 to correspond to the height-adjusting bar 41. Thus, the height-adjusting bar 41 may be vertically movable between a first position at which the height-adjusting bar 41 is completely inserted into the groove 11 and a second position at which the height-adjusting bar 41 protrudes from the bottom surface of the soil box 10.

To vertically move the height-adjusting bar 41, various driving units may be adopted. In the current embodiment, a cylinder 42 may be mounted on a lower portion of the soil box 10. A piston 43 of the cylinder 42 may be coupled to the height-adjusting bar 41 and vertically moved to lift the height-adjusting bar 41.

Also, an upper portion of the height-adjusting bar 41 may be firmly coupled to the surface plate 21. For example as shown in FIG. 3, one of the two height-adjusting bars 411 and 412 adjacent to each other may ascend, and the other one may not ascend. Thus, if it is intended to sharply adjust the curve of the surface plate 21, i.e., to form a sharp slope, the height-adjusting bar 411 that does not ascend has to be coupled to the surface plate 21. If the height-adjusting bar 411 that does not ascend is not coupled to the surface plate 21, since an area of the surface plate 21 disposed on the height-adjusting bar 411 ascends also, it may be difficult to form the sharp slope, i.e., a gentle slope may be formed.

In the current embodiment, the height-adjusting bars 41 and the surface plate 21 may be coupled to each other at a plurality of positions with a predetermined distance according to a length of each of the height-adjusting bars 41. As illustrated in FIG. 3, the height-adjusting bar may have a variable length. Thus, a position at which the height-adjusting bar 41 is coupled to the surface plate 21 may vary according to the length of the height-adjusting bar 41.

Also, a portion of the plurality of height-adjusting bars 41 may be a rotatable height-adjusting bar 413. The rotatable height-adjusting bar 413, as shown in FIG. 4, may be rotatable on a plane that is parallel to the bottom surface of the soil box 10. Through the rotation of the rotatable height-adjusting bar 413, one rotatable height-adjusting bar 413 may be disposed at various angles. As the rotatable height-adjusting bar 413 is changed in installation angle, various curves may be formed on the surface plate 21.

Figure 6:
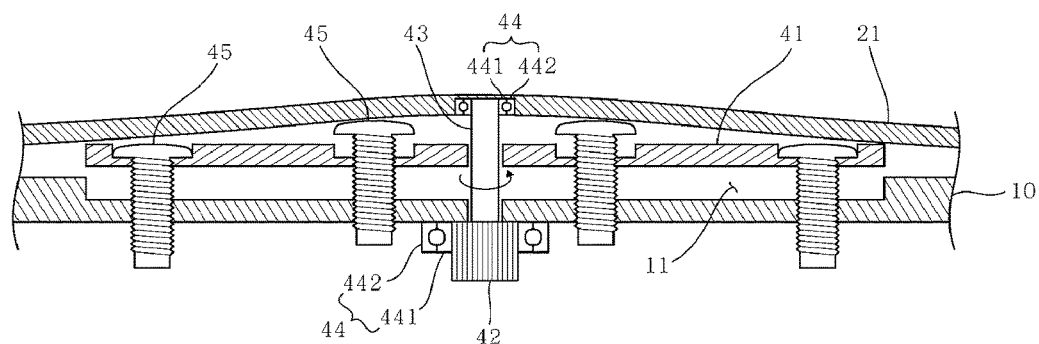
FIG. 6 is a view for explaining a configuration in which a rotatable height-adjusting bar is coupled to a surface plate by using a bearing and nut according to a second embodiment of the present invention.

To rotate the height-adjusting bar 413, various units may be adopted. For example as shown in FIGS. 5 and 6, the piston 43 installed on the cylinder 42 may be rotatable. In the current embodiment, the cylinder 42 itself may be rotatable. That is, a bearing 44 for rotatably coupling an inner ring 441 to an outer ring 442 may be provided on a lower portion of the soil box 10. Here, the outer ring 442 may be coupled to the lower portion of the soil box 10 and thus may not be rotatable, and the inner ring 441 may be coupled to only the outer ring 442 and thus be rotatable with respect to the soil box 10. When the cylinder 42 is fitted into the inner ring 441 of the bearing 44, the cylinder 42 may be rotatably supported by the bearing 44. After the height-adjusting bar 413 protrudes from the groove 11 to ascend to the second position, the user may rotate the cylinder 42 at a desired angle.

Also, in the current embodiment, the rotatable height-adjusting bar 413 may not be coupled to the surface plate 21. However, in another embodiment, the rotatable height-adjusting bar 413 may be coupled to the surface plate 21. This will be described below.

At least one of the plurality of height-adjusting bars 41 is coupled to the plurality of second height-adjusting bolts 45.

In the current embodiment, a plurality of screw holes 48 are defined in the height-adjusting bar 41 in a longitudinal direction of the height-adjusting bar 41. The second height-adjusting bolts 45 are screw-coupled to the screw holes 48, respectively. A head 451 of each of the second height-adjusting bolts 45 is disposed on the height-adjusting bar. Also, a (−) or (+)-shaped groove (not shown) in which a driver is fitted may be defined in a lower end of a screw shaft 452 of the second height-adjusting bolt 45 to forwardly or backwardly rotate the second height-adjusting bolt 45.

In the current embodiment, since the second height-adjusting bolt 45 itself is rotated, the second height-adjusting bolt 45 and the surface plate 21 may not be coupled to each other. However, in another embodiment, the second height-adjusting bolt 45 may be coupled to the surface plate 21. This will be described below.

The second height-adjusting bolt 45 may relatively move up and downwards with respect to the height-adjusting bar 41. Thus, in the state where the height-adjusting bar 41 ascends at a predetermined height, the curve of the surface plate 21 may be minutely adjusted by the second height-adjusting bolt 45.

The first height-adjusting bolt 46 may be provided in plurality on the bottom surface of the soil box 10. As illustrated in FIG. 3, the first and second height-adjusting bolts 46 and 45 may be disposed in a matrix form on the bottom surface of the soil box 10 with respect to an initial position at which the height-adjusting bar 41 is not rotated.

The first height-adjusting bolt 46 may be configured to form a curve of the surface plate 21 on an area that is relatively less than that of the height-adjusting bar 41, i.e., a specific spot. Also, the height-adjusting bar 41 may be advantageous to form a large curve, and the first and second height-adjusting bolts 46 and 45 may be advantageous to form a fine curve on the slope. Since the large curve and the fine curve are mixed on the slope on which the actual landslide occurs, the first and second height-adjusting bolts 46 and 45 in addition to the height-adjusting bar 41 are adopted to the present invention. Also, the first and second height-adjusting bolts 46 and 45 may be disposed the entire area of the lower portion of the surface plate 21 in the matrix form to realize the fine curve in various shapes.

The ascending structure of the first height-adjusting bolt 46 may be similar to that of the second height-adjusting bolt 45. That is, a plurality of screw holes 18 may be defined in the bottom surface of the soil box 10, and a head 461 of the first height-adjusting bolt 46 may be disposed on the bottom surface and coupled to each of the screw holes 18. Also, a (−) or (+)-shaped groove (not shown) in which a driver is fitted may be defined in a lower end of a screw shaft 462 of the first height-adjusting bolt 46. The first height-adjusting bolt 46 may be forwardly or backwardly rotated to vertically move the first height-adjusting bolt 46.

In the current embodiment, since the first height-adjusting bolt 46 itself is rotated, the first height-adjusting bolt 46 and the surface plate 21 may not be coupled to each other. However, in another embodiment, the first height-adjusting bolt 46 may be coupled to the surface plate 21. This will be described below.

As described above, the prevent invention may adopt the bendable surface plate 21, the height-adjusting bar 41, the first height-adjusting bolt 46, and the second height-adjusting bolt 45 so that the landslide surface is variable in a desired shape. The height-adjusting bar 41 may make the large curve on the relatively large area, and the first and second height-adjusting bolts 46 and 45 may make the fine curve on the relatively small area. Thus, the surface plate 21 may be variable in shape. Also, a portion of the plurality of height-adjusting bars 41 may be coupled to the surface plate 21, and the other portion may not be coupled to the surface plate 21. Also, a portion of the height-adjusting bars 41 may be rotatable. Similarly, a portion of the first and second height-adjusting bolts 46 and 45 may be coupled to the surface plate 21, and the other portion may not be coupled to the surface plate 21. As described above, the slope on which the landslide occurs may be accurately and finely realized through the various mechanical constitutions. Thus, the landslide behavior in various conditions may be thoroughly studied. The various coupling structures between the surface plate 21 and the height-adjusting members 46 and 45 will be described below.

One of the most important features in landslide occurrence effects may be an effect due to a vibration motion like an earthquake and blasting. To realize the earthquake motion, a vibration unit for moving the soil box 10 itself up and downwards may be provided.

In the current embodiment, a cylinder 60 may be provided as the vibration unit. The cylinder 60 may be provided in plurality along a longitudinal direction of the soil box 10.

The cylinder 60 may include a cylinder body 61 and a piston 62. In the current embodiment, a hydraulic cylinder that operates by an oil pressure may be used as the cylinder 60. The cylinder body 61 may be fixedly installed on the base member 20. An upper end of the piston 62 may be hingeably coupled to the soil box 10. The piston may be vertically reciprocated by applying or releasing the oil pressure to vibrate the soil box 10 up and downwards. In the current embodiment, two cylinders 60 may be provided to equally adjust vertical vibration amplitudes of the two cylinders. Alternatively, only one cylinder may be vibrated, or two cylinders may be differently adjusted in vibration amplitude.

Also, since the soil box 10 is supported by the base member 20 by using the two cylinders 60 as media, the two cylinders 60 may be disposed at heights different from each other to adjust an initial inclined angle of the soil box 10. The initial inclined angle of the soil box 10 may be confirmed through the clinometer 15 attached to the soil box 10. Also, the initial inclined angle of the soil box 10 may be easily set by adjusting the height of the piston 62.

A ground acceleration due to the amplitude may be obtained as follows.

A gravity acceleration g due to a height h and a time t may be expressed as the following expression.

$$h = \tfrac{1}{2} g t^2$$

Since the gravity acceleration is about 0.98 m/s$^2$, a turnaround time may be expressed as the following expression so as to obtain about 0.1 g of gravity acceleration with respect to the vertical motion having about 0.05 m of vibration amplitude.

$$t^2 = 0.05 \text{ m}/(0.98 \text{ m/s}^2) = 0.319 \text{ s}$$

That is, when the vertical reciprocating motion of the soil box is completely performed for a time of about 0.319 seconds, the gravity acceleration may reproduce the earthquake motion having about 0.1 g of gravity acceleration. Also, the reciprocating speed may be altered to change the ground acceleration so as to meet experimental conditions.

As described above, in the slope behavior of the landslide, the shape changing unit may be adopted to apprehend the effect due to a shape of the landslide surface. Also, the vibration unit may be adopted to apprehend the effect due to the vibration motion at the slope. Also, like the existing soil box experimental apparatus, water may be supplied into the soil box to apprehend an effect due to rainfall. Thus, the important factors in the landslide may be applied to the experiment. Therefore, the occurrence behavior of the actual landslide may be accurately experimentally apprehended according to the present invention.

So far, although the rotatable height-adjusting bar 413 is not coupled to the surface plate 21 in the embodiment that is described with reference to FIGS. 1 to 4, a rotatable height-adjusting bar 413 may be coupled to a surface plate 21 in a second embodiment of FIG. 6.

Referring now to FIG. 6, a bearing 44 may be inserted into the surface plate 21. An outer ring 442 of the bearing 44 may be fixedly coupled to the surface plate 21, and an inner ring 441 may be rotatable with respect to the outer ring 442.

Also, in the embodiment of FIGS. 1 to 4, the first and second height-adjusting bolts 46 and 45 may be directly screw-coupled to the bottom surface (i.e., the screw hole 18) of the soil box 10 or the height-adjusting bar 41 (i.e., the screw hole 48). That is, since the first and second height-adjusting bolts 46 and 45 have to be rotated, the first and second height-adjusting bolts 46 and 45 may not be coupled to the surface plate 21, but be in simply contact with the surface plate 21.

Figure 8:
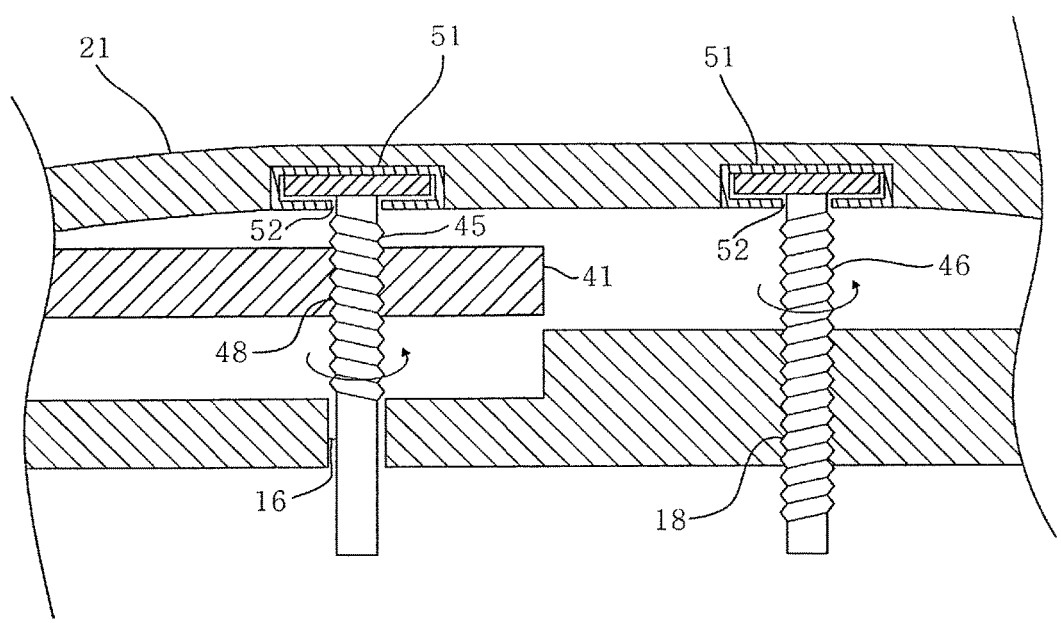
FIG. 8 is a view for explaining a configuration in which a first height-adjusting bolt and a second height-adjusting bolt are coupled to a surface plate according to a fourth embodiment of the present invention.

However, in a another embodiment as shown in FIG. 8, a surface plate 21 and first and second height-adjusting bolts 46 and 45 may be coupled to each other.

Figure 7:
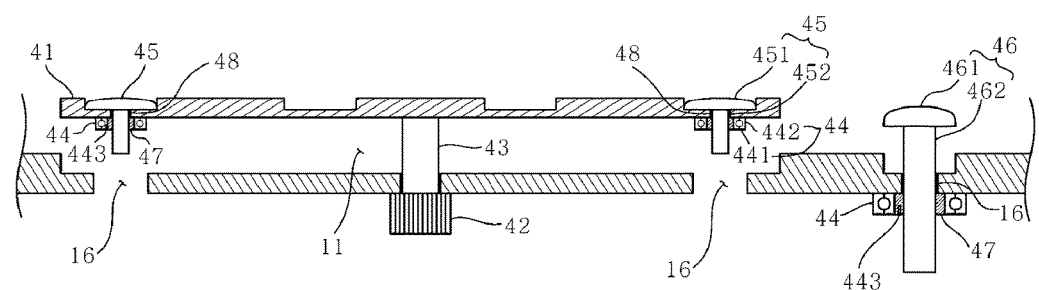
FIG. 7 is a view for explaining a configuration in which a first height-adjusting bolt and a second height-adjusting bolt are coupled to a surface plate by using a bearing, nut, and pin hole according to a third embodiment of the present invention.

As shown in FIGS. 7 and 8, the second height-adjusting bolt 45 will be described first. A plurality of screw holes 48 are defined in the height-adjusting bar 41 in a longitudinal direction of the height-adjusting bar 41. The second height-adjusting bolt 45 is inserted into each of the through holes 16. As shown in FIG. 2, a head 451 of the second height-adjusting bolt 45 is disposed on the height-adjusting bar 41, and a nut 47 is fitted and screw-coupled to a screw shaft 452. As shown in FIG. 7, the nut 47 may be rotated in a forward or backward direction in a state where the nut 47 is fixed in position. When the nut 47 is rotated in the state where the nut 47 is fixed in position, the second height-adjusting bolt 45 may not be rotated, but may be vertically moved. As described above and as shown in FIG. 8, since the second height-adjusting bolt 45 is not rotated, the second height-adjusting bolt 45 may be firmly coupled to a housing 51 in the surface plate 21 through the well-known various coupling methods. To rotate the nut 47 in the state where the nut 47 is fixed in position, as illustrated in FIG. 7, the nut 47 may be fitted into the inner ring 441 of the bearing 44, and the outer ring 442 may be fixed to the height-adjusting bar 41. If a pin hole 443 is defined in the nut 47 or the inner ring 441 of the bearing 44, a pin (not shown) may be fitted and rotated into the pin hole 443. When only one of the inner ring 441 and the nut 47 is rotated, the inner ring 441 and the nut 47 may be rotated together with each other to rotate the nut in the forward or backward direction because the inner ring 441 and the nut 47 are coupled to each other.

Like the second height-adjusting bolt 45, as shown in FIG. 7, the first height-adjusting bolt 46 may also be vertically moved by using the bearing 44 and the nut 47, but may not be rotated. In this case, the bearing 44 may be coupled to a lower portion of the soil box 10, and the through hole 16 of the soil box 10 in which the first height-adjusting bolt 46 is fitted may be a simple hole in which a screw thread is not formed on an inner circumferential surface thereof.

If the above-described constitutions are adopted so that the first and second height-adjusting bolts 46 and 45 are not rotated, but vertically moved, since many bearings have to be used, this may be uneconomical.

Thus, in a fourth embodiment of FIG. 8, a structure in which first and second height-adjusting bolts 46 and 45 are coupled to a surface plate 21 without using a bearing is proposed.

Referring to FIG. 8, in the fourth embodiment, a cylindrical housing 51 having a thin thickness and an empty inner space is inserted into the surface plate 21. A slit 52 is defined in a bottom surface of the housing 51 along a diameter direction of the housing 51.

Since the first and second height-adjusting bolts 46 and 45 are directly screw-coupled to a screw hole 18 of the soil box 10 or a screw hole 48 of a height-adjusting bar 41, the first and second height-adjusting bolts 46 and 45 may be forwardly or backwardly rotated to ascend or descend. Also, alphabet "T" shape is formed in an upper end of each of the first and second height-adjusting bolts 46 and 45.

When the upper end of each of the first and second height-adjusting bolts 46 and 45 is inserted into the housing 51 through a slit 52 and then rotated, the first and second height-adjusting bolts 46 and 45 may rotatably ascend. While the first and second height-adjusting bolts 46 and 45 are rotated to ascend at the same time, the first and second height-adjusting bolts 46 and 45 may contact a top surface of the inside of the housing 51 to continuously press the housing 51 upward. Since the housing 51 is coupled to the surface plate 21, the housing 51 may ascend. If it is intended to allow the surface plate 21 to descend, when the first and second height-adjusting bolts 46 and 45 are backwardly rotated to descend, the surface plate 21 may not be supported by the first and second height-adjusting bolts 46 and 45. Thus, the surface plate 21 may descend to its original position due to an elastic force of the surface plate 21 that is intended to return to its original position.

As described above, since the present invention experimentally reproduces all of the slope shape, the earthquake motion, and the rainfall which are important factors of the landslide occurrence causes, the landslide occurrence behavior may be apprehended for each factor.

Furthermore, according to the present invention, the height-adjusting bar, the first height-adjusting member, and the second height-adjusting member may be used to adjust the inclined angle of the landslide surface and the various large and small curves.

Also, according to the present invention, the constitution that rotates the height-adjusting bar to adjust the installation angle of the height-adjusting bar and various constitutions for coupling the first and second height-adjusting members and the height-adjusting bar to the surface plate may be provided to economically manufacture the experimental apparatus.

The description of the present invention is intended to be illustrative, and those with ordinary skill in the technical field of the present invention pertains will be understood that the present invention can be carried out in other specific forms without changing the technical idea or essential features. Hence, the real protective scope of the present invention shall be determined by the technical scope of the accompanying claims.

The invention claimed is:

1. An apparatus for a soil box experiment applying up and downward vibration, the apparatus comprising:
   a soil box for realizing a slope on which landslide occurs, the soil box being inclinedly disposed and having an opened upper portion to accommodate soil therein;
   a base member disposed under the soil box to support the soil box;
   a vibration unit disposed on the base member to vibrate the soil box up and downwards;
   a plurality of shape changing units to change the shape of the bottom surfaces of the soil box, and each shape changing unit comprises:
      a surface plate disposed on the bottoms surface of the soil box, the surface plate being formed of a bendable and flexible material; and
   a plurality of height-adjusting members disposed on the bottom surface of the soil box to move up and downwards, the plurality of height-adjusting members adjusting a height of the surface plate,
   wherein the height-adjusting member comprises a plurality of height-adjusting bolts that are screw-coupled to the bottom surface and movable up and downwards.

2. The apparatus of claim 1, further comprising a plurality of cylinders in which each cylinder comprises:
   a cylinder body disposed within the base member; and
   a piston movable up and downward in the cylinder body, wherein an upper end of the piston is coupled to the soil box.

3. The apparatus of claim 2, wherein the each cylinder of the plurality of cylinders are spaced apart from each other in a longitudinal direction of the soil box, and
   each piston is hingeably coupled to the soil box.

4. The apparatus of claim 1, further comprising a clinometer attached to the soil box to determine a degree of incline of the soil box.

5. The apparatus of claim 1, wherein each of the height-adjusting members comprises a height-adjusting bar having a bar shape and lengthily disposed on the bottom surface of the soil box.

6. The apparatus of claim 5, wherein a plurality of height-adjusting bolts are spaced apart from each other along a longitudinal direction of the height-adjusting bar and screw-coupled, and
   the height-adjusting bolts are movable up and downwards with respect to the height-adjusting bar.

7. The apparatus of claim 5, wherein the height-adjusting bar is rotatable on the bottom side of the soil box.

8. The apparatus of claim 1, wherein a plurality of through holes in which the height-adjusting bolts are respectively fitted are defined in the bottom surface of the soil box, and
   the apparatus further comprises a nut that is rotatable with respect to the bottom surface of the soil box and vertically fixed in position to vertically move the height-adjusting bolts as the nut is forwardly or backwardly rotated.

9. The apparatus of claim 1, wherein the height-adjusting members comprises a first height-adjusting bolts having a bolt shape and screw-coupled to bottom of the soil box, a plurality of height-adjusting bars lengthily disposed in one direction and movable up and downwards between a first position at which each of the height-adjusting bar is inserted into the bottom surface of the soil box and a second position at which the each of the height-adjusting bar protrudes from the bottom surface, and a second height-adjusting bolts having a bolt shape and screw-coupled to the height-adjusting bar,
   the plurality of are disposed in traverse and longitudinal directions of the soil box, and
   the first and second height-adjusting bolts are disposed in a matrix form on the bottom surface.

* * * * *